UNITED STATES PATENT OFFICE.

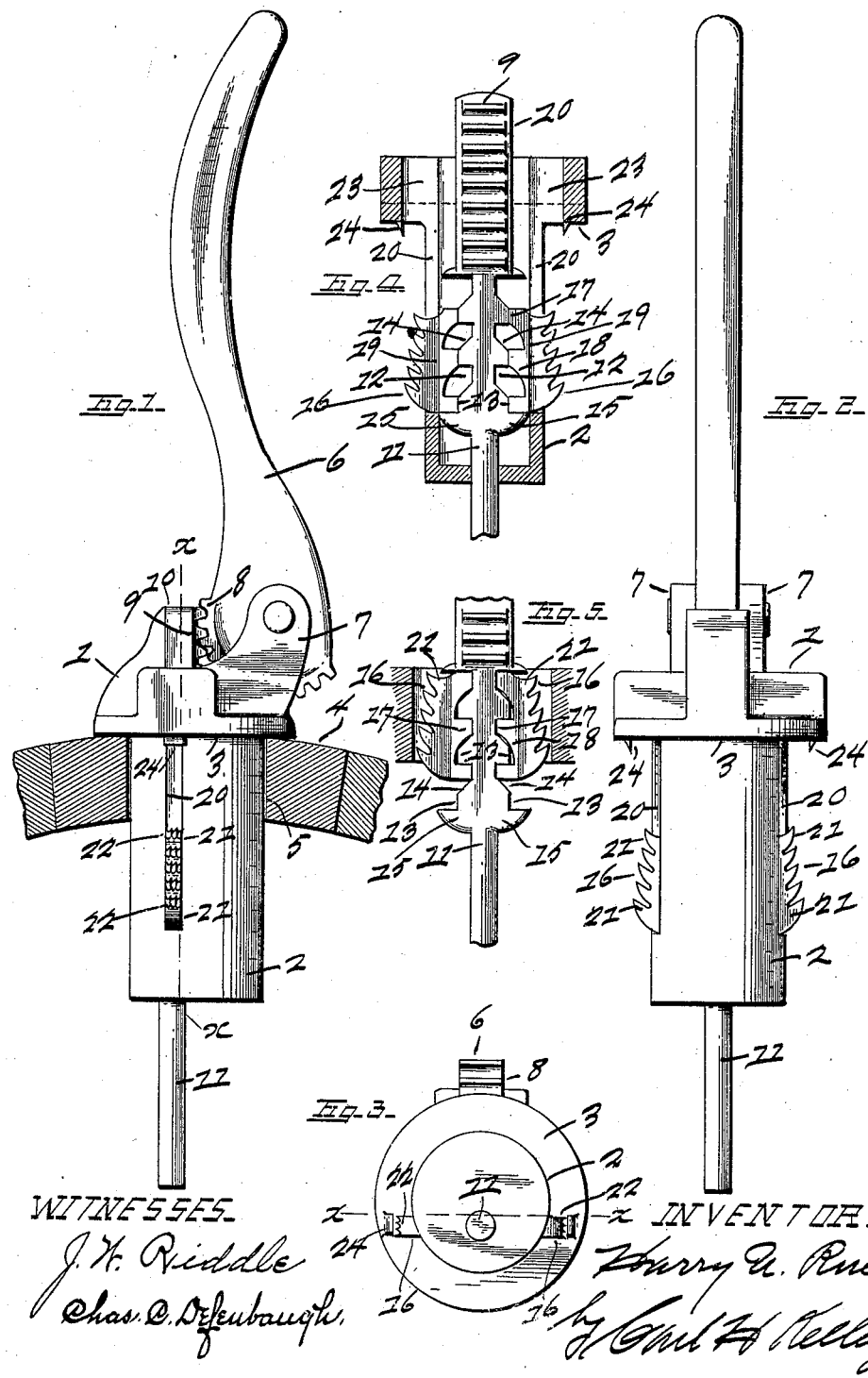

HARRY U. RUEDY, OF TOLEDO, OHIO.

TOOL FOR NOTCHING BUNG-HOLES.

No. 828,425.

Specification of Letters Patent.

Patented Aug. 14, 1906.

Application filed August 7, 1905. Serial No. 272,968.

*To all whom it may concern:*

Be it known that I, HARRY U. RUEDY, of Toledo, county of Lucas, and State of Ohio, have invented certain new and useful Improvements in Tools for Notching Bung-Holes; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to tools for notching bung-holes of barrels and casks adapted to receive a metal bushing of the character described in Letters Patent of the United States issued to Gardiner, dated September 5, 1899, and numbered 632,457.

In carrying out my invention I employ the novel combination and arrangement of parts and the details of construction hereinafter shown, described, and claimed.

In the accompanying drawings, illustrative of my invention, Figure 1 is a side elevation of my improved tool, the same being inserted in position for operation into the bung-hole of a cask or barrel. Fig. 2 is a front elevation of the tool. Fig. 3 is a bottom plan view thereof. Fig. 4 is a section on line *x x*, Fig. 1, showing the cutter members in extended position. Fig. 5 is a view showing the cutter members retracted by contact with the sides of the bung-hole.

In the drawings, 1 is a cast-metal body having the hollow cylindrical shell 2, adapted for insertion into the usual bung-orifice of a cask or barrel intended to be fitted with a two-part bushing. Extending around the upper end of the cylindrical sheel 2 is a shoulder 3, adapted to rest upon the stave 4 of the cask or barrel immediately surrounding the bung-orifice, (indicated at 5.)

6 is an operating-handle pivoted between upwardly-extending lugs 7 upon the body, and said handle is provided adjacent to its pivotal connection with gear-teeth 8, adapted to engage the teeth 9 of a rack 10, suitably guided so as to operate in a vertical direction within the body. Extending downwardly from the rack and preferably forming an integral part thereof is a stem 11, having recesses 12 on opposite sides at equal distances apart and having the plane vertical faces 13, the inclined faces 14, and shouldered offsets 15, the latter being provided to engage the lower ends of cutter members 16, disposed on opposite sides of the stem 11. Cutter members 16 have their inner faces formed complementary to the recessed sides of the stem, being provided with plane vertical faces 17, adapted to contact with the faces 13, and the inclined faces 18, adapted to contact with the inclined faces 14. The cutter members are also provided upon their sides with shoulders 19, adapted to limit their outward projection by engagement with the margins of slots 20, formed in the walls of the cylindrical shell 2, said slots being disposed in a plane at one side of the vertical axis of said shell. Cutter members 16 are provided with a plurality of cutting-teeth 21, projecting through the slots 20, the same being of gradually-increasing length from top to bottom, each tooth being adapted to cut a thin section from the stave in the margin of the bung-orifice. The extreme outer faces of said teeth are preferably provided with a number of vertical grooves 22, Figs. 1 and 3, the cutting effectiveness of the teeth being thereby increased. To permit the cutter members to attain the extreme upward limit of their movement when the tool is operated, the shoulder 3 is cut away interiorly, as at 23, on opposite sides, and at the outer margins of said cut-away portions are provided downwardly-projecting cutting edges 24, adapted to coöperate with the lowermost teeth of the cutting members to complete the cutting of the notches in the bushing-orifice.

The operation of the device is as follows: The cylindrical shell of the tool is inserted, as indicated in Fig. 1, into the orifice intended to be notched to receive a two-part bushing, the insertion being limited by the shoulder 3. As the shell fits the orifice quite snugly, it is obvious that the cutter members projecting from the sides of the shell would interfere with the insertion of the tool if no means were provided to cause said members to recede into the shell during the operation. The arrangement of the recessed stem 11 and the complementary inner faces of the cutter members is such, however, that the instant the cutter members contact at their lower ends with the margins of the bung-orifice they will be forced inward, assuming then the position shown in Fig. 5. After the cutters have been inserted into the orifice a sufficient distance to be out of contact with the margins thereof they will immediately fall by gravity to assume the position shown in Fig. 4, being projected outward because of the inclined faces 14 and 18 being in contact. When in lowered and outward position, the vertical faces 13 and 17 will be in contact, and it is obvious that the cutter members cannot now be forced inward by direct pressure upon their toothed faces. Upon depressing the operating-handle to cause the rack 10 and the stem to be raised it is evident that the cutter members will also be raised therewith. The margin of the bung-orifice in the path of the cutter-teeth being forcibly engaged between the latter and the shoulder 3 will now be effectively cut away, the complete cutting of the upper ends of the notches thus formed being effected by reason of the downwardly-projecting cutting edges 24.

From the foregoing it becomes clear that I have provided a simple, compact, and effective tool for notching bung-holes adapted for bushings of the character referred to.

While I have specifically illustrated only a preferred embodiment of my invention, I do not intend to exclude other examples from the scope thereof which involve merely colorable alterations and modifications or changes in detail, as the entire invention or segregable parts may be appropriated and embodied in such a way as not to constitute a substantial departure.

Having described my invention, what I claim, and desire to secure by Letters Patent, is—

1. In a tool for notching bung-holes, a body adapted for insertion into a bung-hole, an element guided for vertical movement in said body, means for operating said element, and cutter members normally projecting on opposite sides of said body, having operative engagement with said element to permit them to be retracted when said body is inserted into a bung-hole, substantially as described.

2. In a tool for notching bung-holes, a body comprising a cylindrical shell and a shoulder thereon, said shell being slotted in a vertical direction, retractile cutter members projecting through said slots, a vertically-movable element in said body adapted to engage said cutter members, and means carried upon the body for imparting vertical movement to said element, substantially as described.

3. In a tool for notching bung-holes, a body comprising a cylindrical shell and a limiting-shoulder thereon, said shell provided with slots in a plane at one side of its vertical axis, retractile cutter members projecting through said slots and provided with teeth gradually increasing in length from top to bottom, a vertically-movable element within the body adapted to engage said cutter members, and means mounted upon the body for imparting vertical movement to said element, substantially as described.

4. In a tool for notching bung-holes, a body comprising a cylindrical shell having an outwardly-extending shoulder at its upper portion and provided with slots through its side walls, a rack guided for vertical movement within the body, retractile cutter members having a movement along said slots in the body and operatively connected with said rack, downwardly-extending cutting edges upon the shoulder adjacent to the path of the cutter members, and a toothed operating-lever for actuating said rack, substantially as described.

5. In a tool for notching bung-holes, a body comprising a cylindrical shell provided with a shoulder and having vertical slots through its side walls disposed in a plane at one side of its vertical axis, a rack vertically movable in said body, a toothed operating-handle pivoted upon the body to engage said rack, a downwardly-extending stem integral with the rack having the vertical faces 13, the shouldered offsets 15, and having the lateral recesses provided with inclined faces 14, cutter members having their inner faces formed complementary to the recessed portion of the stem, and having outwardly-projecting teeth of increasing length from top to bottom, a shoulder upon said cutter members to limit their outward projection, and downwardly-extending cutting edges upon the shoulder of the body, substantially as described.

In testimony that I claim the foregoing as my own I affix my signature in presence of two witnesses.

HARRY U. RUEDY.

Witnesses:
CARL H. KELLER,
ULRICH RUEDY.